Oct. 22, 1940.  A. J. PENICK ET AL  2,219,271
VALVE ASSEMBLY
Filed July 22, 1939
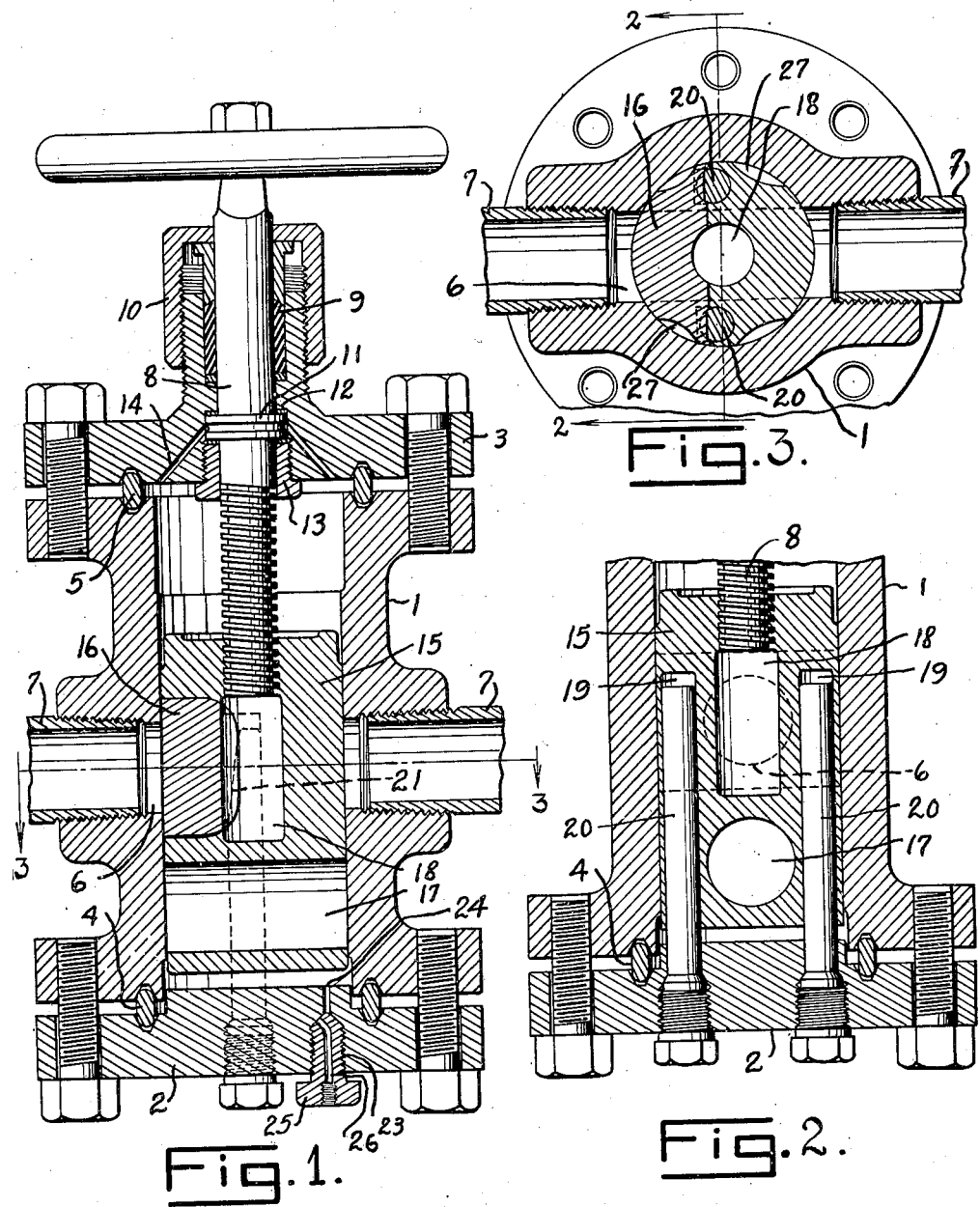
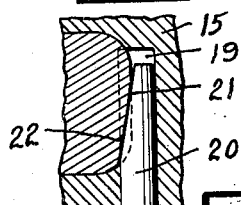
Fig. 1.  Fig. 2.  Fig. 3.  Fig. 4.
Inventors
ARTHUR J. PENICK
KIRBY T. PENICK
By E. V. Hardway,
Attorney Patented Oct. 22, 1940

2,219,271

UNITED STATES PATENT OFFICE 2,219,271

VALVE ASSEMBLY

Arthur J. Penick and Kirby T. Penick, Houston, Tex.

Application July 22, 1939, Serial No. 285,834

3 Claims. (Cl. 251—68)

This invention relates to a valve assembly.

An object of the invention is to provide means for controlling the flow of fluid, particularly the flow of fluid through pipe and the like.

It is another object of the invention to provide a valve assembly comprising a valve casing adapted to be incorporated into a flow line and having a controlling assembly in the casing movable to one position to form a continuous unobstructed passageway through the casing connecting the sections of the flow-line and movable to another position to completely close the flow line, and to form fluid tight joints to prevent leakage.

It is another object of the invention to provide in a valve assembly guides for guiding the movement of the controlling assembly said guides being arranged to co-act with the valve to effect fluid tight seals between the controlling assembly and the valve casing around the flowway therethrough.

Another object of the invention is to provide novel means for lubricating the movable parts of the valve assembly.

The invention herein disclosed embodies certain improvements over the type of valve assembly disclosed by co-pending applications Serial Nos. 235,387, filed October 17, 1938; 239,830, filed November 10, 1938, and 244,533 filed December 8, 1938.

With the above and other objects in view, the invention has particular relation to certain novel features of construction, operation and arrangement of parts, an example of which is given in this specification and illustrated in the accompanying drawing, wherein:

Figure 1 shows a longitudinal, sectional view of the complete assembly.

Figure 2 shows a fragmentary cross-sectional view taken on the line 2—2 of Figure 3.

Figure 3 shows a transverse sectional view taken on the line 3—3 of Figure 1, and Figure 4 shows a fragmentary sectional view.

Referring now more particularly to the drawing wherein like numerals of reference designate the same parts in each of the figures, the numeral 1 designates the valve casing substantially cylindrical in shape and having the end plate 2 closing one end thereof and the bonnet 3 closing the other end thereof, said end plate and bonnet being secured to the casing in any preferred manner, as by means of bolts, as shown. Annular gaskets as 4, 5 will provide fluid tight seals between the casing and said end plate and bonnet.

The casing 1 has the flowway 6 extending transversely therethrough into which the adjacent sections 7, 7 of the flow line are screwed.

Extended axially through the bonnet 3 there is a valve stem 8 and surrounding this stem in the outer end of this bonnet there is a stuffing box 9 which is retained in place, and the compression on which is regulated, by the flange nut 10 which is screwed on to the bonnet and which surrounds the stem. The stem is rotatable in the bonnet but is retained therein against longitudinal movement by means of an annular rib 11 on the stem which is retained on one side by the inside annular shoulder 12 and on the other side by the inside gland 13. The rib is annularly grooved externally and leading from said groove through the bonnet and terminating in the casing are the lubricant ducts 14.

Fitted closely wtihin the casing there is a controlling assembly comprising a cylindrical carrier 15 having a movable, independent, side segment therein forming a valve 16. The carrier 15 has a passageway 17 therethrough which may be moved into and out of registration with the flowway 6. At one end the carrier and valve have an axial bore 18 one end of which is internally coarsely threaded. The inner end of the stem 8 is externally, coarsely threaded and in mesh with the internal threads of said bore. At its other end the carrier 15 has the oppositely disposed longitudinal bores 19, 19 on opposite sides of the passageway 17. Guides 20, 20 are secured to the end plate 2 and extend inwardly into the bores 19. These guides may be anchored to said endplate in any preferred manner. Preferably their outer ends are enlarged and screwed into said end plate as shown. The inner ends of the guides 20 have the tapering faces 21 as shown more accurately in Figure 4 and the valve 16 has the inside tapering faces 22 positioned to cooperate with the corresponding faces 21.

The controlling assembly may be actuated by an appropriate rotation of the stem 8. When it is desired to close the valve, the stem may be turned to carry the passageway 17 out of registration with the flowway 6 and to move the valve 16 into registration with said flowway. The valve will move with the carrier and when the valve registers with the flowway 6, the tapering faces 22 of the valve will come into contact with the tapering face 21 of the guides 20 and upon further rotation of the stem, in the same direction, the valve 16 will be moved outwardly into close contact with the inside of the casing around said flowway 6 and the carrier 15 will be moved in the opposite direction into close contact with the opposite side of the casing around said flowway and fluid tight joints will thus be formed around the flowway 6.

Upon rotation of the stem in the opposite direction, the controlling assembly will be moved in the opposite direction, thus causing the tapering faces 22 to release the tapering faces 21 and said assembly may then be readily moved in the reverse direction until the passageway 17 alignes with the flowway 6 and a smooth continuous unobstructed passageway will be provided for the flow of fluid through the valve casing.

The end plate 2 has an internally threaded socket 23 and leading inwardly from the inner end of said socket into the casing there is a reduced duct 24. A plug 25 may be screwed into the socket 23. The inner end of this plug is tapered and when the plug is fully screwed home the duct 24 will be closed by it. The plug 25 has an axial inlet passageway 26 whose outer end is internally threaded to receive a grease gun connection and its inner end is overturned so that when the plug is fully screwed home, said inner end will be closed as shown in Figure 1.

The plug 25 may be partly unscrewed and a grease gun connected to it and a lubricant may be forced into the casing 1 which will flow through the external longitudinal grooves 27 in the carrier so as to completely fill the interior of the casing on both sides of the valve carrier. This lubricant will flow through the channels 14 so as to lubricate the stem bearing and when the casing is completely filled with the lubricant the grease gun may be detached and the plug 25 screwed fully home to prevent the escape of the lubricant.

The drawing and description are illustrative merely while the broad principle of the invention will be defined by the appended claims.

What we claim is:

1. A valve assembly comprising a valve casing having a passageway for fluid therethrough, a controlling assembly in the casing including a carrier having a passageway therethrough and having a laterally movable valve seated within the carrier, said carrier also having longitudinal bores and being movable to one position to align said passageways and to another position to align the valve with the passageway through the casing, post-like guides anchored to the casing and whose free ends are extended into said bores and provided with tapering faces, said valve having faces which co-act with the tapering faces of the guides to effect movement of the valve into sealing relation with the inside wall of the casing around the casing passageway when the valve is moved into alignment therewith.

2. A valve assembly comprising a valve casing having a passageway for fluid therethrough, a controlling assembly in the casing including a carrier having a passageway therethrough and having a laterally movable valve seated in the carrier, said carrier having a longitudinal guide-way and being movable to one position to align said passageways and to another position to align the valve with the passageway through the casing, a guide anchored to the casing and whose free end is extended into said guide-way, said valve having a tapering face which co-acts with the free end of the guide to effect movement of the valve and carrier into sealing relation with the inside walls of the casing around the casing passageway when the valve is moved into alignment with said casing passageway.

3. A valve assembly comprising a valve casing having a passageway for fluid therethrough, a controlling assembly in the casing including a carrier having a passageway therethrough and having a laterally movable valve seated in the carrier, said carrier also having a longitudinal guide-way and being movable to one position to align said passageways and to another position to align the valve with the passageway through the casing, a post-like guide anchored, at one end, to the casing and whose free end is extended into, and terminated in, said guide-way, said valve and the extended end of said guide being formed with co-acting parts effective to move the valve and carrier into sealing relation with the inside walls of the casing around the casing passageway when the valve is moved into alignment with said casing passageway.

ARTHUR J. PENICK.
KIRBY T. PENICK.